Dec. 14, 1948.  A. BEHRENS  2,456,168
DISPLAY CARTON WITH SLIDING CLOSURE
Filed Oct. 11, 1946  6 Sheets-Sheet 1

INVENTOR:
ALBERT BEHRENS,
BY
ATTORNEY

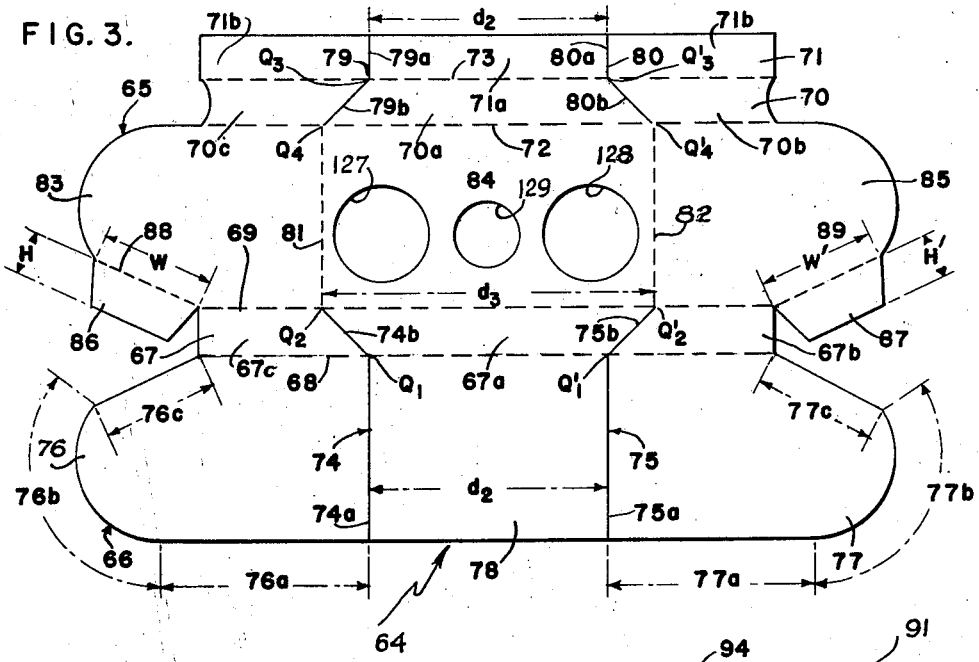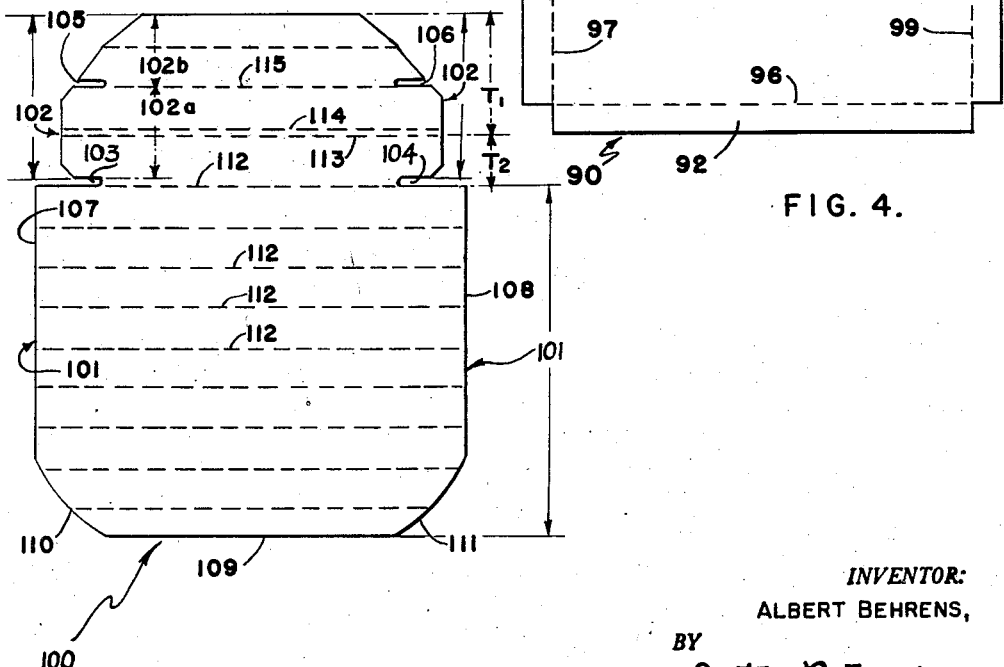

Dec. 14, 1948. A. BEHRENS 2,456,168
DISPLAY CARTON WITH SLIDING CLOSURE
Filed Oct. 11, 1946 6 Sheets-Sheet 3
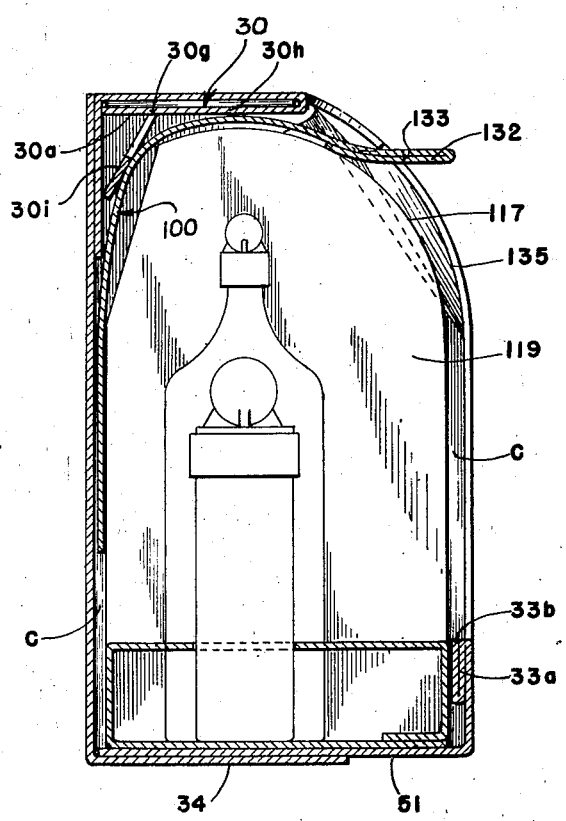
FIG. 5.
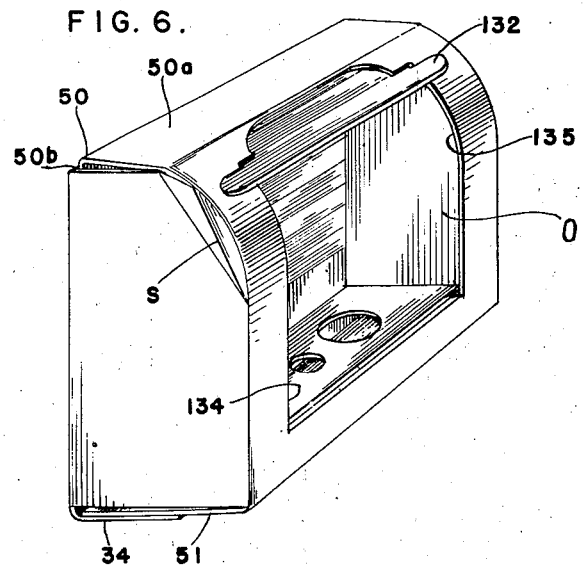
FIG. 6.
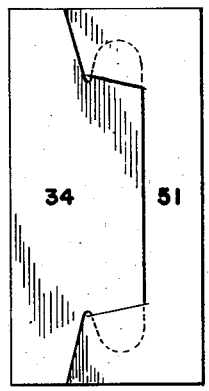
FIG. 7. INVENTOR:
ALBERT BEHRENS,
BY
Arthur Middleton
ATTORNEY Dec. 14, 1948.   A. BEHRENS   2,456,168
DISPLAY CARTON WITH SLIDING CLOSURE
Filed Oct. 11, 1946   6 Sheets-Sheet 4
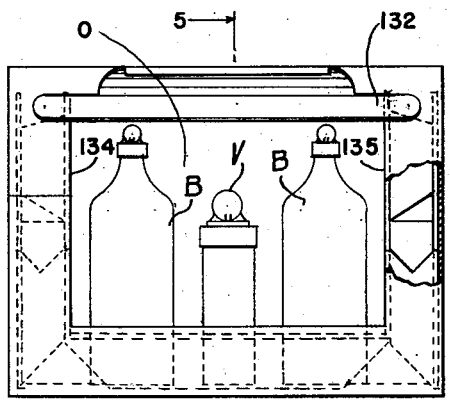
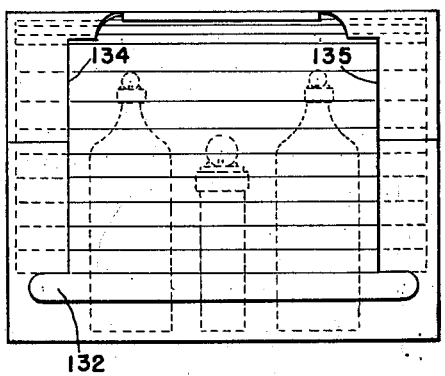
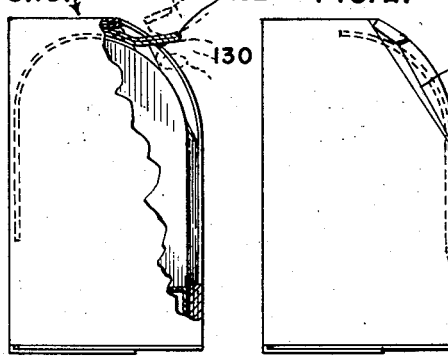
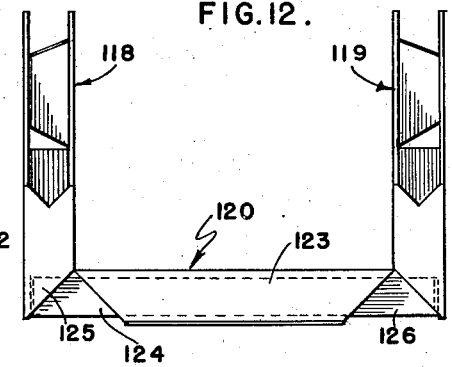
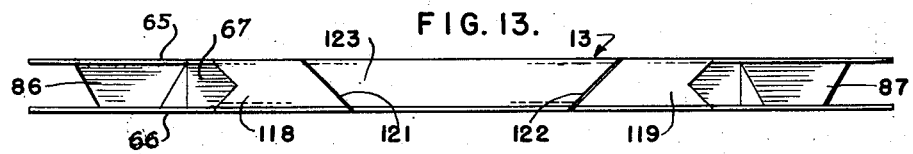
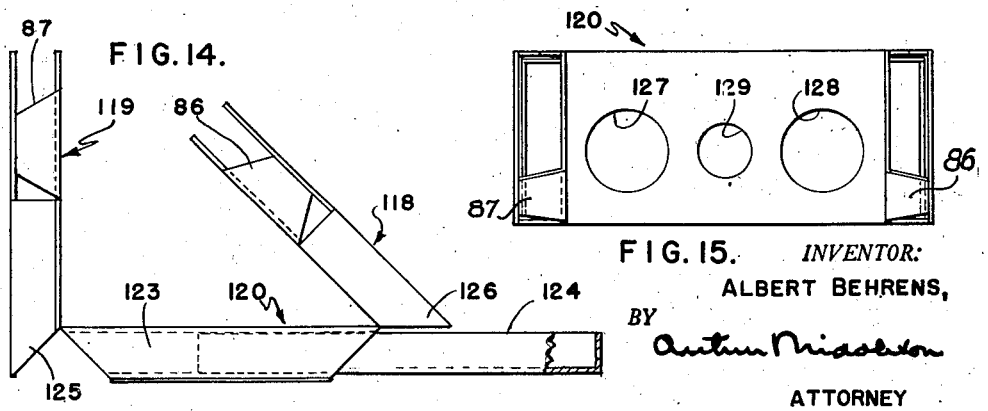
INVENTOR:
ALBERT BEHRENS,
BY
ATTORNEY Dec. 14, 1948.            A. BEHRENS            2,456,168
DISPLAY CARTON WITH SLIDING CLOSURE
Filed Oct. 11, 1946            6 Sheets-Sheet 5

INVENTOR:
ALBERT BEHRENS,
BY
ATTORNEY

Dec. 14, 1948.                A. BEHRENS                2,456,168
                   DISPLAY CARTON WITH SLIDING CLOSURE
Filed Oct. 11, 1946                              6 Sheets-Sheet 6
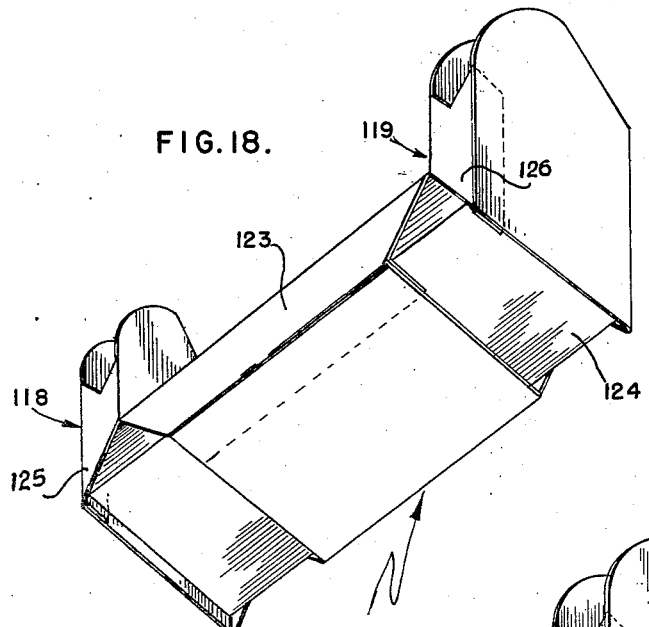
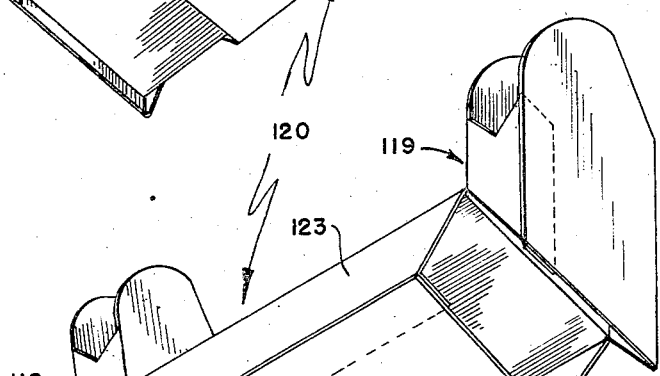
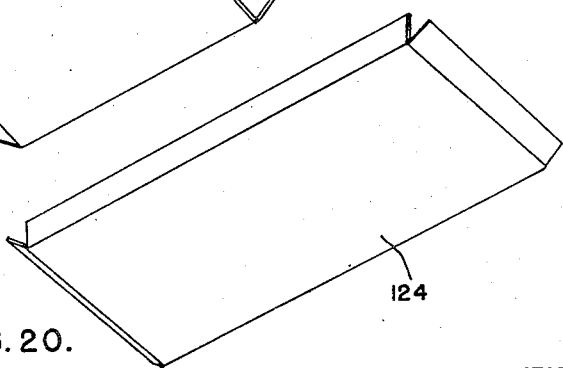
INVENTOR:
ALBERT BEHRENS,
BY
ATTORNEY Patented Dec. 14, 1948

2,456,168

UNITED STATES PATENT OFFICE 2,456,168

DISPLAY CARTON WITH SLIDING CLOSURE

Albert Behrens, New York, N. Y.

Application October 11, 1946, Serial No. 702,783

8 Claims. (Cl. 206—44)

This invention relates to folding cartons for display purposes.

It is among the objects to produce from suitably shaped, scored, and slotted cardboard blanks by folding and inter-engagement of parts or flaps a display container having an opening capable of being opened and closed somewhat in the manner of a roll top desk.

A container thus producible according to this invention requires one foldable blank to represent the carton proper, another blank representing the roll top, and a third blank representing a guide structure insertable into the carton for guiding the sliding movement of the roll top member along a predetermined curved path within the carton.

Some features relate to the carton blank and mode of folding it. According to one feature the carton blank is such as to present an upwardly receding rounded front wall portion even though folded from a flat blank.

Another feature provides that the display opening is provided by the inward folding of a corresponding flap or tongue and utilizing the inwardly folded flap as part of a guide structure for the roll top member. More specifically, this feature calls for a secondary flap or tongue to be struck from the first mentioned flap which will therefore herein be termed the primary flap or tongue.

Another feature relates to the roll top member, in that it is represented by a blank having horizontal parallel score lines enabling it to adapt itself to changing curvatures along its predetermined slide path within the carton.

Other features relate to the insertable guide structure.

According to one feature this is a U-shaped hollow structure produced from a blank having parallel score lines enabling it to be folded into an elongated hollow box-shape and slitted transversely so that upright shanks can be struck from each end of a horizontal body portion, thus constituting the U-shape of which the upstanding shank portions form the immediate guide elements for the roll top member.

More specifically, the slitting of the box-shape is on a bias so that the upright shanks form mitered or pointed corner portions which can be braced against one another by a secondary box-shaped insert portion slidable into the hollow of the horizontal body portion which hollow is exposed and rendered accessible by reason of the bias slitting. The U-shaped insert portion is therefore herein also termed the primary insert portion.

According to another feature the primary insert portion, especially the horizontal body portion thereof serves for receiving and positioning articles, for example cosmetic and perfume bottles, in suitable depressions or sockets.

The invention possesses other objects and features of advantage, some of which with the foregoing will be set forth in the following description. In the following description and in the claims, parts will be identified by specific names for convenience, but they are intended to be as generic in their application to similar parts as the art will permit. In the accompanying drawings there has been illustrated the best embodiment of the invention known to me, but such embodiment is to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings in which Figs. 1 to 4 represent the component blanks with score lines, slits and flaps of the folding display container; Fig. 1 being the blank for the box or carton proper; Fig. 2 being the blank for the roll top member; Fig. 3 being the blank for the primary insert member; Fig. 4 being the blank for the secondary insert member.

Fig. 5 is a vertical section through the folding carton assembled with contents and with the roll top member open.

Fig. 6 is a perspective view of the carton assembled but without display contents, and with the roll top member open.

Fig. 7 is a bottom view of the carton.

Fig. 8 is a front view of the carton with display contents and with the roll top member open.

Fig. 9 is a front view of the carton with the roll top member closed and the display contents indicated in dotted lines.

Fig. 10 is a part sectional end view of the carton illustrating the manipulation of the roll top.

Fig. 11 is an end view of the carton with the roll top member closed, and showing a pleat in the end wall.

Figs. 12 to 15 show the primary and secondary insert members or roll top guide per se in various views; Fig. 12 being a front view with the secondary insert member in place holding the shanks of the primary member in vertical position; Fig. 13 being a top view of the primary insert member showing a preceding stage of shaping or folding of that member; Fig. 14 showing the secondary insert member being inserted into the primary insert member; Fig. 15 being a plan view upon the insert member of Fig. 12.

Figure 16:
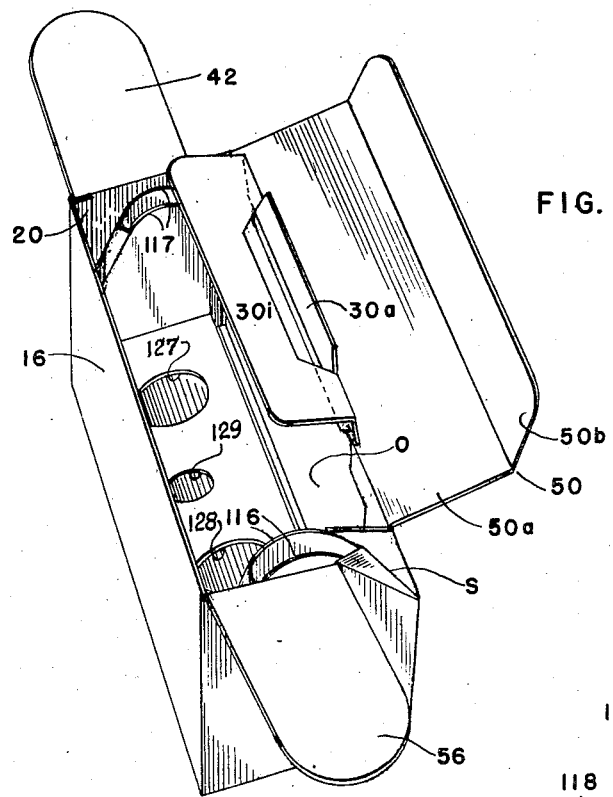

Fig. 16 is a perspective view into the interior of the carton with the top unfolded.

Figure 17:
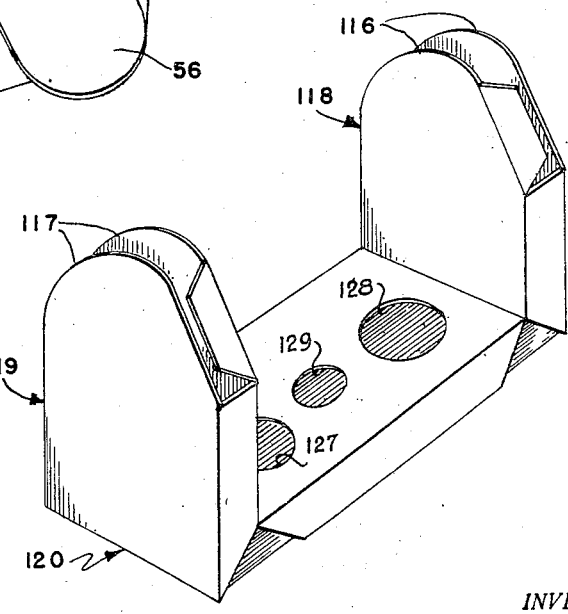

Fig. 17 is a perspective rear view of the primary insert member, with the secondary insert member contained therein.

Fig. 18 is a perspective bottom view of the primary insert member showing more clearly the secondary insert member therein.

Figs. 19 and 20 are bottom views of the primary end of the secondary insert members respectively, detached from one another.

Figure 1:
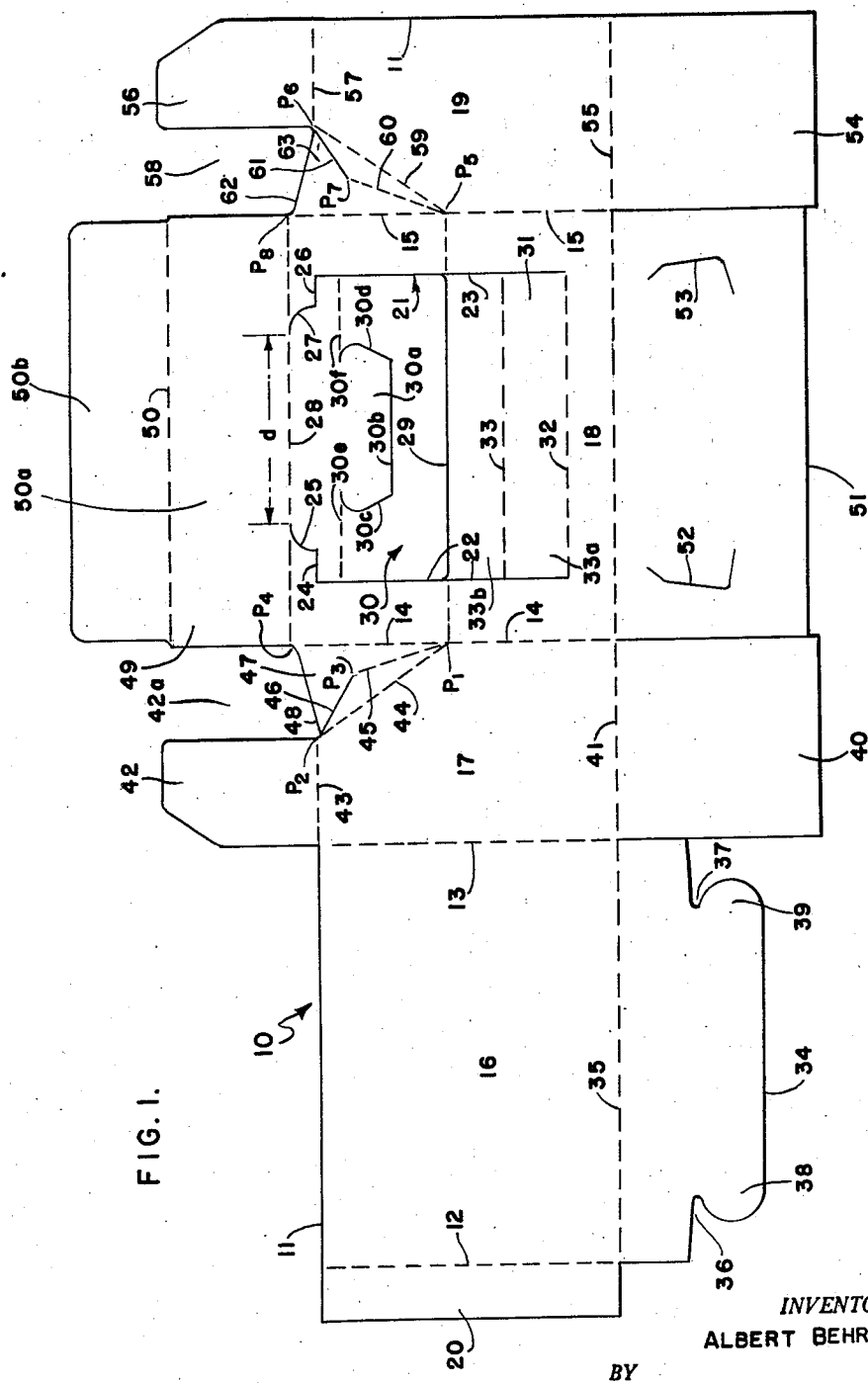

The carton blank 10 in Fig. 1 comprises a body portion 11 constituting the front-, rear-, and end walls as defined by score lines 12, 13, 14 and 15 constituting wall panels 16, 17, 18 and 19 representing in that order from left to right the rear wall, the left hand end wall, the front wall and the right hand end wall. The left hand end wall 16 has along its extreme outer end a glueing flap 20.

The front wall or panel 18 has a display opening 21 formed by a pair of parallel vertical slits 22 and 23, the slit 22 at the top continuing into a short horizontal portion 24 terminating in a curved portion 25, the slit 23 continuing at the top into a short horizontal portion 26 terminating in a curved portion 27. The terminal slit portions 25 and 27 are horizontally spaced from each other as indicated by the distance d, and merge with a horizontal score line 28. A horizontal slit 29 extends midway between the vertical slits 22 and 23 thus forming an upper flap or tab 30 foldable on the horizontal score line 28, and a lower flap or tab 31 foldable along a horizontal score line 32 at its base and capable of being doubled up in a pleat or fold on an intermediate horizontal score line 33 defining panels 33ª and 33ᵇ. The upper flap or primary tab 30 has struck from it a secondary tab 30ª defined by a horizontal edge 30ᵇ and side edges 30ᶜ and 30ᵈ.

The rear wall panel 16 has a bottom closure flap or tab 34 defined by a horizontal score line 35 and having lateral recesses or notches 36 and 37 forming lateral closure tongue portions 38 and 39. The end wall panel 17 has a bottom closure flap or tab 40 of substantially square shape defined by a horizontal score line 41, and a narrower top closure flap or tab 42 defined by a horizontal score line 43. From a point P₁ on the vertical score line 14 there extend divergent score lines 44 and 45, the score line 44 extending to base point P₂ of the closure flap 42, the score line 45 extending to the inner point P₃ of a slit 46 which in turn extends from point P₃ to point P₂ and constitutes a pointed tab 47 also defined by an inclined contour line 48 extending from point P₂ on an upward incline to a point or corner P₄. The point P₄ also marks one base point of a closure flap 49 at the top of the front wall panel 18 which forms with the top closure flap 42 an intervening recess 42ª, and is defined by the horizontal score line 28, and has an intermediate horizontal score line 50 for folding to define a body portion 50ª and a terminal portion 50ᵇ of this closure. The front wall panel 18 has a bottom closure flap or tab 51 having curved slits 52 and 53 for interlocking closing engagement with the lateral tongues 38 and 39 of the complementary closure tab 34.

The end wall panel 19 has a bottom closure flap 54 defined by a horizontal score line 55 and shaped similarly and complementary to the bottom flap 40, and a narrower top closure flap 56 defined by a horizontal score line 57 and forming an intervening recess 58 with the center top closure flap 49.

From a point P₅ midway on the vertical score line 15 extend divergent score lines 59 and 60, the score line 59 meeting the score line 57 in a point P₆ which is a corner base point of closure tabe 56, the score line 60 extending to a point P₇ which is the inner end point of an inclined slit 61 extending from point P₇ to point P₆. Together with an inclined contour line 62 the slit 61 defines a pointed tongue or tab 63, the contour line 62 extending from point P₆ on an upward incline to a point P₈ which constitutes a corner base point of the tab 49.

The blank 64 in Fig. 3 from which the primary insert portion is to be formed, comprises complementary, that is top and bottom portions 65 and 66 (see also Fig. 13) spaced from each other by a wall portion 67 defined by parallel score lines 68 and 69. The top portion 65 has extending therefrom a wall portion 70 and a glueing or connecting tab 71, defined by parallel score lines 72 and 73.

The blank has a pair of symmetrically disposed transverse slits 74 and 75 across the bottom portion 66 sub-dividing the same into a pair of outer tabs 76 and 77 and an intermediate tab 78. The intermediate tab 78 is of substantially square shape, while the outlines of the outer tabs 76 and 77 comprise a straight portion 76ª and 77ª respectively, a curved portion 76ᵇ and 77ᵇ respectively, and a straight but inclined portion 76ᶜ and 77ᶜ respectively. The slits 74 and 75 flare outwardly as they continue across the wall portion 67 from points Q₁ and Q₁' on score line 68 to terminate in points Q₂ and Q₂' on score line 69, thus dividing the wall portion 67 into panels 67ª, 67ᵇ and 67ᶜ. The slits 74 and 75 thus comprise right angle transverse portion 74ª and 75ª respectively and inclined transverse portion 74ᵇ and 75ᵇ.

A complementary arrangement of slits 79 and 80 traverses the wall portion 70 and the glueing tab 71, the slit portions 79ª and 80ª traversing the glueing tab at right angles, and outwardly flaring or inclined portions 79ᵇ and 80ᵇ respectively extending from points Q₃ and Q₃' respectively on score line 73 to points Q₄ and Q₄' respectively on score line 72. Slit portions 79ª and 80ª sub-divide the glueing tab 71 into a pair of outer tab portions 71ᵇ and an intermediate tab portion 71ª, while slit portions 79ᵇ and 80ᵇ sub-divide the wall portion 70 into panels 70ª, 70ᵇ and 70ᶜ. It will be seen that slit portion 74ª is in line with the opposite slit portion 79ª, while slit portion 75ª is in line with the opposite slit portion 80ª. The inclined slit portion 74ᵇ is symmetrical to the opposite inclined slit portion 79ᵇ, while the inclined slit portion 75ᵇ is symmetrical to the inclined slit portion 80ᵇ. Also the inclined slit portion 74ᵇ is symmetrical to the inclined slit portion 75ᵇ, while the inclined slit portion 79ᵇ is symmetrical to the inclined slit portion 80ᵇ. The score lines 69 and 72 are interconnected by transverse score lines 81 and 82 extending between points Q₂ and Q₄, and between points Q₂' and Q₄' respectively, demarking tabs 83, 84 and 85 as component parts of the top portion 65. The outer tabs 83 and 85 as to outline are symmetrical as well as complementary to the tabs 76 and 77 of the bottom portion 66, except for the provision of secondary folding tabs 86 and 87 defined by score lines 88 and 89 respectively. The length of the score line 88 is the same as that of the symmetrical line 76ᶜ and represents the basic width W of the tab 86, the height or length of which is indicated by the character H. Corresponding dimensions of the tab 87 are indicated by the characters W and H'.

The blank 90 in Fig. 4 goes to make up the secondary insert portion (see also Figs. 12, 13, 14 and 15) and comprises a body portion 91 and marginal folding tab portions 92, 93, 94 and 95 defined by score lines 96, 97, 98 and 99.

The blank 100 in Fig. 2 shows the contour of the roll top member defined by a body portion 101 and a tab portion 102 which in turn is defined by a pair of notches 103 and 104 constituting a primary constriction and a pair of notches 105 and 106 constituting a secondary constriction. The contour of the body portion 101 comprises vertical edges 107 and 108, a bottom edge 109, rounded bottom corners 110 and 111, and has extending across it horizontal score lines 112 evenly spaced from one another. A pair of horizontal score lines 113 and 114 spaced closely together extend across the tab portion 102 and intermediate the primary and the secondary constrictions as represented by the respective pairs of notches 103, 104 and 105, 106. Another horizontal score line 115 extends between the notches 105 and 106. Thus the tab 102 has a primary tab portion 102ᵃ of reduced width as compared with the body portion 101, and a secondary tab portion 102ᵇ of reduced width as compared with the primary tab portion 102ᵃ.

The carton is formed from the Fig. 1 blank by folding on the vertical score lines 12, 13, 14 and 15 so that the glueing tab 20 can be cemented to the inside of panel 19 (see also Fig. 16). The bottom of the carton is formed by folding the tabs 34, 40, 51 and 54 inwardly and interlocking them in the customary manner of carton closure. The top of the carton is formed by folding inwardly along the inclined score lines 45 and 60 as well as along the score lines 44 and 59 respectively to form tapering inward pleats S (see Figs. 11 and 16), and also folding along score lines 43, 28, 50 and 57 and interlocking or closing the tabs 42, 49 and 56 as indicated in Figs. 5, 6 and 16.

The display opening 21 in the front panel 18 of the carton becomes effective as such when the upper or primary tab 30 is folded inwardly (as indicated in Figs. 5 and 16) with a break along score lines 30ᵉ and 30ᶠ, that is at the corner 30ᵍ (see Fig. 5), thus dividing the tab 30 into a horizontal body portion 30ʰ and an inclined terminal portion 30ⁱ. The secondary tab 30ᵃ remains in line with the horizontal tab portion 30ʰ and lodges in the upper rear corner of the carton and underneath the top cover flaps 42, 49 and 56 when closed. The secondary tab 30ᵃ thus also serves as a spacer and for positioning the tab 30 within the upper portion of the carton in a manner whereby it may effectively serve as the upper guide for the roll top member 101.

The underside of the roll top member 100 is confined or guided by the curved top edges 116 and 117 of the upright portions 118 and 119 respectively of a primary insert member 120 from the Fig. 3 blank.

The primary insert member 120 is formed by first folding it on the score lines 68, 69, 72 and 73 into the preliminary shape of the straight hollow box-shaped open-ended member shown in Fig. 13 and cementing the tri-sectioned glueing tab 71 to the corresponding opposite three tab sections 76, 78 and 77 (as indicated in Fig. 18 and Fig. 19 in full and dotted lines). Because of the slits 74ᵃ, 74ᵇ, 79ᵃ, 79ᵇ and 75ᵃ, 75ᵇ, 80ᵃ, 80ᵇ in the Fig. 3 blank forming a pair of symmetrical diagonal slits 121 and 122 the end portions of the Fig. 13 member can now be struck upward to constitute the shanks or upright portions 118 and 119 as distinguished from the central or body portion 123 of the primary insert member 120. The body portion 123 of the primary insert member 120 is reinforced by a secondary insert member 124 formed from the Fig. 4 blank 90, the manner of insertion being illustrated in Fig. 14. Fig. 12 also indicates the manner in which the secondary insert member 124 braces the shanks 118 and 119 against one another so as to help maintain them in upright position as the ends of the box-shaped secondary insert member engage or lodge in the pointed or bias-shaped inner corner portions 125 and 126 of the shanks 118 and 119.

The secondary tabs 86 and 87 of the Fig. 3 blank are folded inwardly (see Figs. 13, 14, 15 and 17) at a right angle to their respective primary tabs 83 and 85 to serve as stiffeners and spacers for the tabs 83 and 85 relative to the opposite tabs 76 and 77. At the top the body portion 123 of the primary insert member 120 is shown to have a pair of larger holes 127 and 128 and a smaller hole 129 interposed between the two larger ones to form receiving sockets for display articles such as the bottles B or vials V shown in Figs. 5, 8 and 9.

The primary insert member 120 and more particularly the upright shanks 118 and 119 thereof form with the surrounding carton walls a clearance C (see Fig. 5) within which and along which the roll top member 100 may slide when actuated by thumb 130 and forefinger 131 (see Fig. 10) grasping a finger tab 132 of the roll top member, Figs. 5, 8 and 10 showing the display window open, while Figs. 9 and 11 show it closed. It will be understood that the finger tab 132 is formed from an integral portion of the roll top member 100, namely by making a complete fold of the portion T₁ of the tab 102 (see Fig. 2) on score lines 113, 114, that is by doubling it up so it contacts face to face with the remaining portion T₂ of tab 102 and with part of the body portion 101 of the roll top member and then cementing the contacting faces together as at 133 (see Fig. 5). The notches 105 and 106 will then match with notches 103 and 104 so as to form a single pair of notches in which engage the vertical edge portions 134 and 135 (see Figs. 6, 8 and 9) of the display opening O in the front wall of the carton.

I claim:

1. A folding box comprising a housing having a front panel, a rear panel, a pair of end panels, all panels being defined by vertical score lines, bottom closure flaps extending from the lower ends of said panels to form a bottom closure, a main top closure flap extending from the top of the front panel and having a horizontal score line at its base as well as a horizontal intermediate score line defining a horizontal body portion and a vertically tucked-in end portion, a pair of auxiliary top closure flaps each one of which extends from a respective end panel and is spaced a distance from said main closure flap, the end panel upper portions between each auxiliary flap and the main closure flap being foldable in an inward pleat defined by diverging score lines having their center at an intermediate point of the respective vertical score lines of the front panel, whereby the upper portion of the front portion is allowed to recede from the plane of the lower portion of the front panel, the front panel having a substantially rectangular display opening defined by a lower tongue portion extending from the bottom side of said opening, said tongue portion being foldable inwardly due to a horizontal base score line and an intermediate horizontal score line, said opening being further defined by an upper complementary tongue portion extending from the top side of said opening and folded inwardly and having a body portion extending horizontally and a terminal portion inclining downwardly and towards the rear panel, said upper tongue portion having struck therefrom a secondary tongue portion extending horizontally rearwardly and in line with said horizontal body portion of the upper tongue portion, a guide structure having a horizontal base portion and a pair of upstanding shank portions and being insertable in said housing whereby the folded lower tongue portion intervenes between the front panel and the base portion of said guide structure, and up and down slideable roll top member for said opening confined in its sliding path inwardly by said guide structure and outwardly by said front panel by said upper tongue portion, and by said rear panel.

2. A folding box according to claim 1, in which the guide structure comprises an open ended hollow wall structure of rectangular shallow cross-section formed into a U-shaped structure having a horizontal body portion and a pair of vertical shank portions struck up from said body portion.

3. A folding box according to claim 1, in which the guide structure comprises an open ended hollow wall structure of rectangular shallow cross-section formed with a U-shaped structure having a horizontal body portion and a pair of vertical shank portions struck up from said body portion, and a bracing member insertable into said body portion and engageable upon the foot ends of the shank portions for bracing them against each other in maintaining their vertical position.

4. In a folding box a housing blank comprising a front panel, a rear panel, a pair of end panels, a connecting flap for cornerwise attaching the free end of the rear panel to the free end of one end panel, all end panels being defined by vertical score lines, bottom closure flaps extending from the lower ends of said panels, a main top closure flap extending from the top of the front panel and having a horizontal score line at its base as well as a horizontal intermediate score line defining a body portion foldable into a horizontal plane and an end portion foldable into a vertical plane to extend downwardly from said horizontal plane, a pair of auxiliary top closure flaps each one of which extends from a respective end panel and is spaced a distance from said main closure flap, the end panel upper portions between each auxiliary flap and the main closure flap being foldable in an inward pleat defined by diverging score lines having their center at an intermediate point of the respective vertical score lines of the front panel, whereby the upper portion of the front portion is adapted to recede from the plane of the lower portion of the front panel if said pleats are folded, the front panel having a substantially rectangular display opening defined by a lower tongue portion extending from the bottom side of said opening, said tongue portion being foldable inwardly due to a horizontal base score line and an intermediate horizontal score line, said opening being further defined by an upper complementary tongue portion extending from the top side of said opening and foldable inwardly and having a body portion adapted to extend in a horizontal plane when folded and a terminal portion adapted to extend downwardly when folded along an intermediate horizontal line, said upper tongue portion having struck therefrom a secondary tongue portion adapted to extend horizontally rearwardly and in line with the body portion when the latter is folded.

5. A housing blank according to claim 4, in which each pleat is defined by an upper end portion of the respective vertical score line between the front panel and an end panel, an inclined score line extending from said center to the adjacent base point of the respective top closure flap and an intermediate score line intersecting with an inclined slit which in turn extends from the point of such intersection substantially to said adjacent base point of the respective top closure flap, whereby there is created a substantially triangular horizontally extending tongue portion pointing away from said front panel but towards the front panel when the pleat is folded.

6. In a roll top folding box an insertable guide structure for the roll top comprising a blank having a top panel including a middle section and a pair of end sections defined by a pair of transverse score lines, a bottom panel similar to the top panel, a first side panel between said top panel and said bottom panel, a second side panel extending parallel to the first side panel at the outer edge of the top panel, and a connecting tab extending along the outer edge of said second side panel, all said panels together with said connecting tab being defined with respect to one another by corresponding score lines to permit their being folded towards one another to constitute a hollow open-ended structure, said bottom panel having a pair of transverse parallel slits trisecting the panel, the adjacent side panel having a first pair of outwardly inclined slits traversing it in continuation of said parallel slits and terminating at the respective adjacent ends of said transverse score lines of the top panel, said connecting tab having a pair of parallel transverse slits trisecting it in line with the first-mentioned pair of parallel slits, the second side panel having a second pair of outwardly inclined slits traversing it in continuation of the adjacent pair of parallel slits in the connecting tab and terminating at the respective adjacent ends of said transverse score lines of the top panel.

7. An insertable guide structure according to claim 6, with the addition of a bracing member comprising a blank having a rectangular main panel and marginal panels foldable towards one another along score lines defined by the shape of the rectangular panel and thus adapted to extend in planes at right angles to said main panel.

8. In a roll top folding box of the character herein shown and described, a roll top member comprising a blank having a substantially rectangular body portion having horizontal score lines, a primary tab portion slightly narrower than the body portion and defined against the body portion by a pair of opposedly disposed cutouts extending parallel to said score lines, and also by a score line extending horizontally between said cut-outs, said primary tab having an intermediate horizontal score line, a secondary tab portion extending from the primary tab portion and defined by a pair of opposedly arranged cut-outs and a horizontal score line extending horizontally between the score lines, said primary tab being foldable along its intermediate score line in a manner whereby the first-mentioned pair of cut-outs registers with the last-mentioned pair of cut-outs.

ALBERT BEHRENS.

REFERENCES CITED

The following references are of record in the file of this patent:

UNITED STATES PATENTS

| Number | Name | Date |
|---|---|---|
| 1,945,945 | Lowen | Feb. 6, 1934 |